(12) United States Patent
Hanson et al.

(10) Patent No.: US 7,461,883 B2
(45) Date of Patent: Dec. 9, 2008

(54) GOLF CAR GLOVE BOX

(75) Inventors: Bradley J. Hanson, North Augusta, SC (US); Richard Krall, Augusta, GA (US)

(73) Assignee: Textron Inc., Providence, RI (US)

( * ) Notice: Subject to any disclaimer, the term of this patent is extended or adjusted under 35 U.S.C. 154(b) by 321 days.

(21) Appl. No.: 11/365,901

(22) Filed: Mar. 1, 2006

(65) Prior Publication Data

US 2007/0216184 A1   Sep. 20, 2007

(51) Int. Cl.
*B60N 3/12* (2006.01)
(52) U.S. Cl. .............................. 296/37.12; 280/DIG. 5
(58) Field of Classification Search ................ 296/37.1, 296/37.8, 37.12; 280/DIG. 5
See application file for complete search history.

(56) References Cited

U.S. PATENT DOCUMENTS

| 4,445,720 | A | * | 5/1984 | Leaf et al. ................ 296/37.12 |
| 4,868,448 | A | * | 9/1989 | Kornrumpf ................. 310/331 |
| 5,971,461 | A | * | 10/1999 | Vaishnav et al. ......... 296/37.12 |
| 6,869,120 | B2 | * | 3/2005 | Johnson et al. .......... 296/37.12 |

* cited by examiner

*Primary Examiner*—Joseph D Pape
(74) *Attorney, Agent, or Firm*—Harness, Dickey & Pierce, P.L.C.

(57) ABSTRACT

A golf car glove box including: an upper portion; a lower portion opposite to the upper portion; a rear portion; a face portion opposite to the rear portion; a first side portion between the rear portion and the face portion; a second side portion between the rear portion and the face portion; an aperture defined by the face portion; a door mounted within the aperture with a hinge; and a trim base extending from the face portion. The glove box defines an enclosed space.

17 Claims, 7 Drawing Sheets

GOLF CAR GLOVE BOX

FIELD

The present disclosure relates to an apparatus and method for a golf car.

BACKGROUND

The statements in this section merely provide background information related to the present disclosure and may not constitute prior art.

Golf cars can be provided with one or more storage bins, commonly known as glove boxes, for storing various items. Each glove box can typically include a door mounted directly to an instrument panel of the golf car with a hinge. Opening the door can grant access to the area behind the instrument panel. A separate instrument panel design is used to accommodate the door. Therefore, conventional golf cars require two instrument panel designs, one for use in applications with glove boxes and one for use in applications without glove boxes. While such glove boxes are suitable for their intended use, they are subject to improvement.

SUMMARY

The present teachings provide for a golf car glove box including: an upper portion; a lower portion opposite to the upper portion; a rear portion; a face portion opposite to the rear portion; a first side portion between the rear portion and the face portion; a second side portion between the rear portion and the face portion; an aperture defined by the face portion; a door mounted within the aperture with a hinge; and a trim base extending from the face portion. The glove box defines an enclosed space.

The present teachings further provide for a golf car including: a front body at a front end of the golf car; a glove box mounted to the front body; and an instrument panel trim portion mounted to the front body and the glove box. The glove box includes: an upper portion; a lower portion opposite to the upper portion; a rear portion; a face portion opposite to the rear portion; an aperture defined by the face portion; a door mounted within the aperture; and a trim base extending from the face portion and secured to the front body.

The present teachings also provide for a golf car including: a front body at a front end of the golf car, the front body including a plurality of fastening devices; a glove box defining an enclosed space independent of the front body mounted within the front body, the glove box in cooperation with the fastening devices to secure the glove box within the front body; and an instrument panel trim portion mounted to the front body and the glove box to secure the glove box within the front body.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
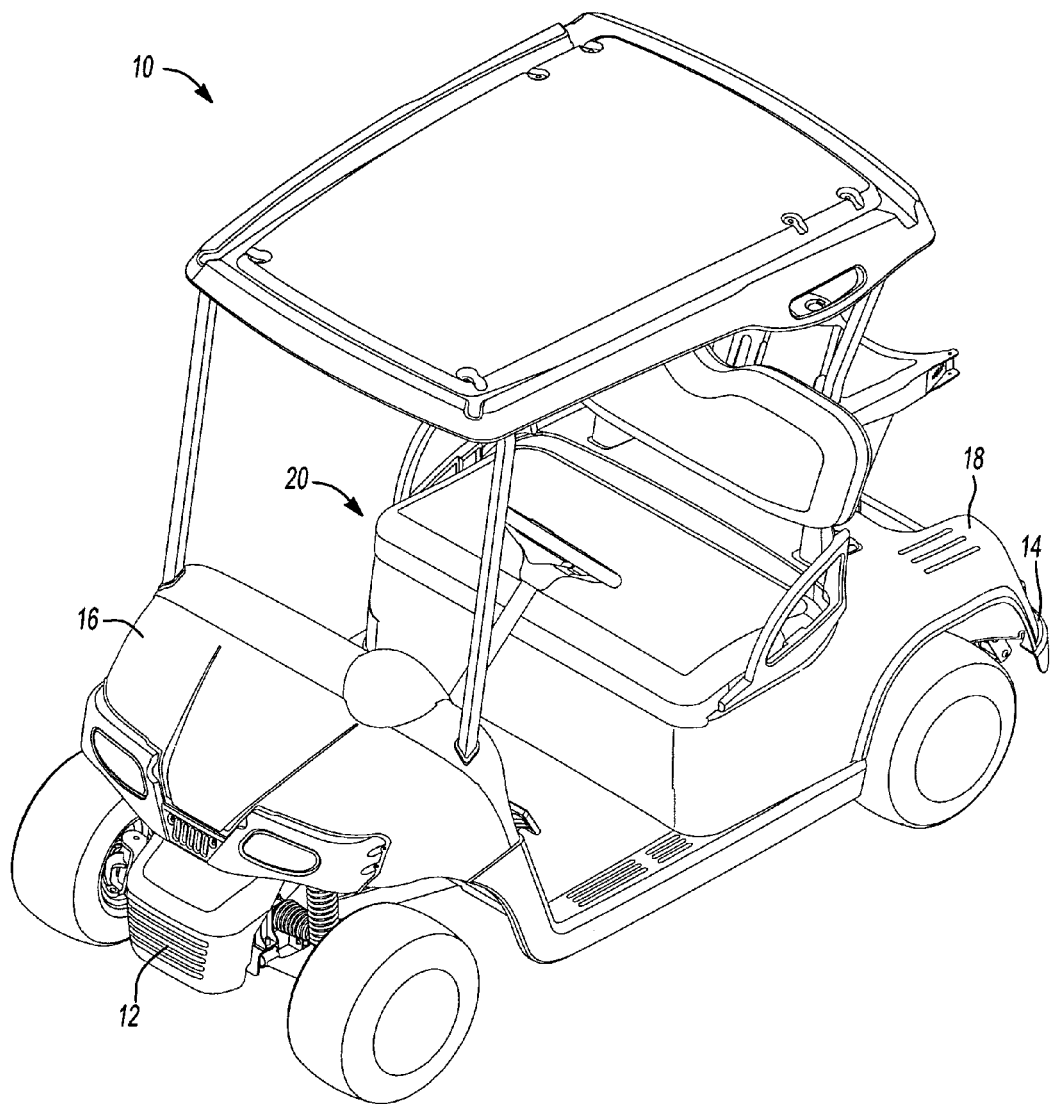
FIG. 1 is a perspective view of a golf car according to various embodiments.

The following description is merely exemplary in nature and is in no way intended to limit the present disclosure, application, or uses. Throughout this specification, like reference numerals will be used to refer to like elements.

A golf car according to the present teachings is illustrated in FIG. 1 at reference numeral 10. The golf car 10 can include a front end 12 and a rear end 14 opposite to the front end 12. The front end 12 can include a front body 16 and the rear end 14 can include a rear body 18. A main seat assembly 20 can be mounted to the rear body 18.

Figure 2:
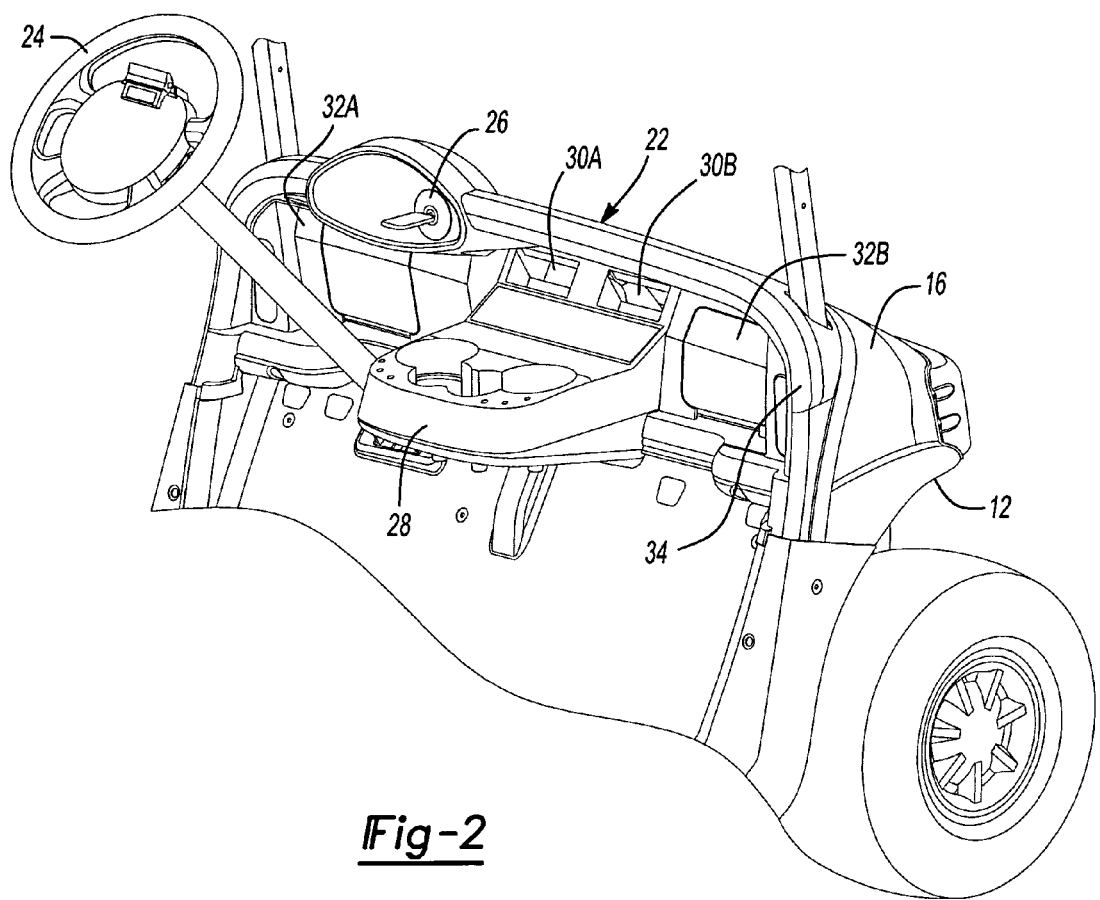
FIG. 2 is a perspective view of an instrument panel of the golf car.

With additional reference to FIG. 2, the front body 16 can include an instrument panel 22 and a steering wheel 24 extending from the front body 16 toward the main seat assembly 20. The instrument panel 22 can include an ignition switch 26, a cup holder assembly 28, a pair of golf ball retention receptacles 30A and 30B, a first storage bin 32A that can be at a driver's side of the car 10, a second storage bin 32B that can be at a passenger's side of the car 10, and an instrument panel trim portion 34. The storage bins 32A and 32B are commonly referred to in the art as glove boxes and will be referred to as glove boxes herein.

Figure 5:
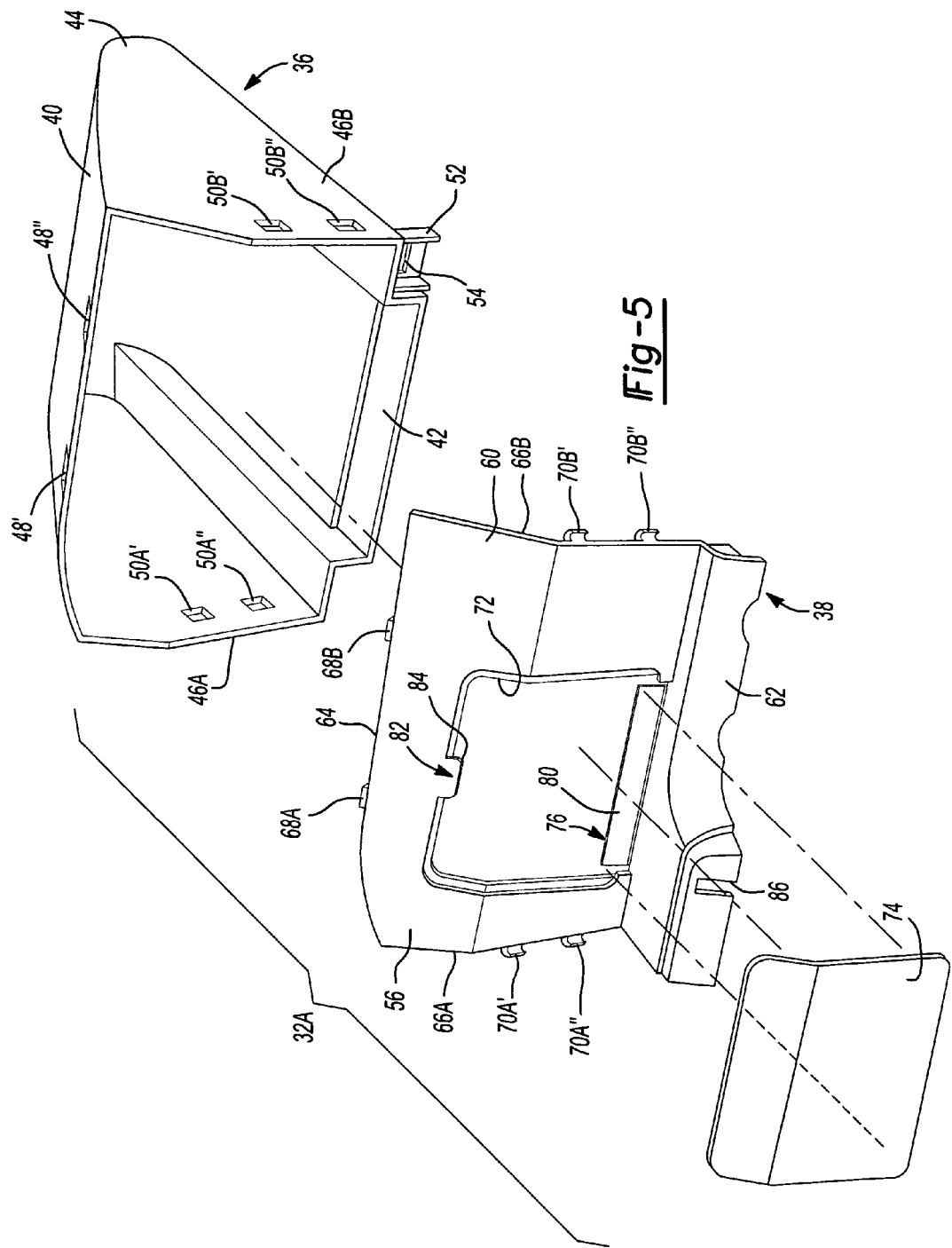
FIG. 5 is an exploded view of the glove box.
Figure 6:
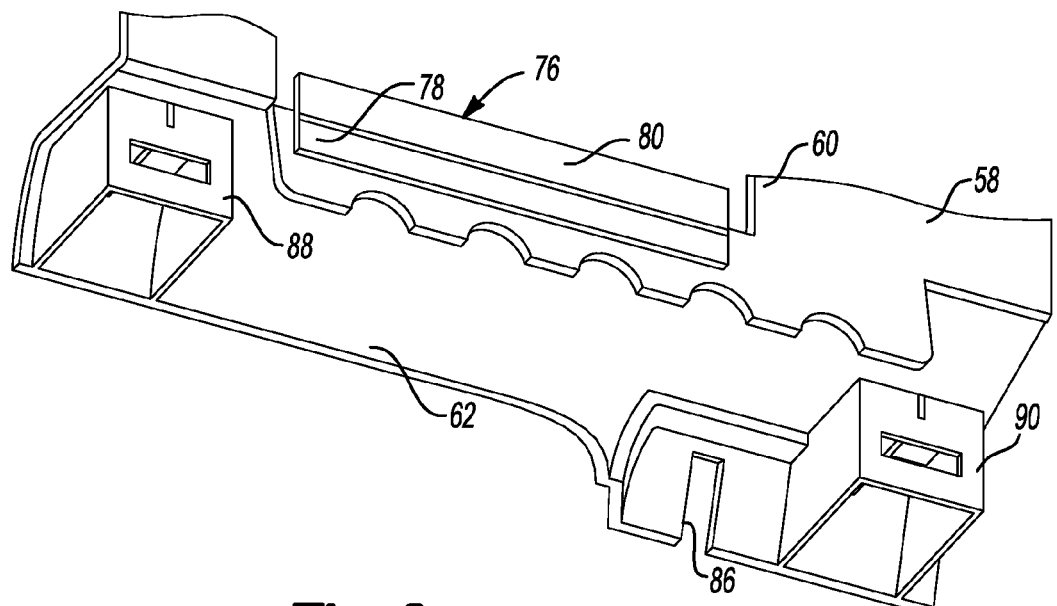
FIG. 6 is a rear view of a lower portion of the glove box.

With additional reference to FIGS. 3-6, particularly to FIG. 5, the first glove box 32A can include a main body 36 and a face portion 38. The main body 36 can include an upper portion 40, a lower portion 42, a rear portion 44, a first side portion 46A, and a second side portion 46B. The upper portion 40 can include one or more notch openings 48' and 48" that can extend through the upper portion 40. The first side portion 46A can have one or more first notch openings 50A' and 50A". The second side portion 46B can have one or more second notch openings 50B' and 50B". The notch openings 48 and 50 can be located within the main body 36 at an end of the main body 36 opposite to the rear portion 44. The lower portion 42 can include a lower flange 52, which can have an aperture 54.

The upper portion 40, the lower portion 42, the rear portion 44, and the first and the second side portions 46A and 46B can be integrally formed to provide the main body 36. The main body 36 can have any suitable shape to allow the main body 36 to be seated within the front body 16 and at the instrument panel 22.

The face portion 38 can have a front side 56 and a rear side 58 (FIG. 6), that can be opposite to the front side 56. The face portion 38 can include a front wall 60 and a trim base 62. The front wall 60 can extend from the trim base 62. The front wall 60 can include an upper side 64, a first side 66A, and a second side 66B. Extending from the upper side 64 can be one or more upper locking details, such as upper locking details 68A and 68B. Extending from the first side 66A can be one or more side locking details, such as side locking details 70A' and 70A". Extending from the second side 66B can also be one or more side locking details, such as side locking details 70B' and 70B".

The front wall 60 can include an aperture 72 that can extend from the front side 56 to the rear side 58 of the front wall 60. Mounted within the aperture 72 can be a door 74. The door 74 can be any suitable size or shape for covering the aperture 72. The door 74 can be rotationally mounted at the aperture 72 to permit movement of the door 74 between a closed position in which the door 74 covers the aperture 72 and an open position in which the door 74 does not cover the aperture 72.

The door 74 can be rotationally mounted at the aperture 72 with a suitable mounting device, such as a hinge 76. The hinge 76 can be positioned at a portion of the aperture 72 proximate to the trim base 62. The hinge 76 can include a first portion 78 (FIG. 6) and a second portion 80. The first portion 78 can be mounted at the trim base 62 and the second portion 80 can be mounted to the door 74.

A locking mechanism 82 can be positioned at a portion of the aperture 72 proximate to the upper side 64 of the front wall 60. The locking mechanism 82 can include a locking tab 84. The locking tab 84 can be a flexible locking tab. The locking tab 84 can be configured to receive the door 74 and secure the door 74 in the closed position in which the door 74 covers the aperture 72. The locking mechanism 82 can also be any suitable locking mechanism.

The trim base 62 can include a slit 86 that can extend from the front side 56 to the rear side 58 of the face portion 38. The trim base 62 can also include a first slot 88 and a second slot 90. Each of the first slot 88 and the second slot 90 can be at the rear side 58 (FIG. 6) of the face portion 38 and at opposite ends of the face portion 38.

The face portion 38 can be mounted to the main body 36 to define an enclosed space within the first glove box 32A. The face portion 38 can be mounted to the main body 36 through cooperation between the upper locking details 68A and 68B of the front wall 60 with the upper notch openings 48' and 48" respectively of the main body 36; through cooperation between the first side locking details 70A' and 70A" of the front wall 60 with the side notches 50A' and 50A" respectively of the first side 46A; and through cooperation between the second side locking details 70B' and 70B" of the front wall 60 with the side notches 50B' and 50B" respectively of the second side 46B. The face portion 38 can be mounted to the main body 36 so that the second slot 90 of the face portion 38 is aligned with the aperture 54 of the main body 36.

The first glove box 32A can be made of any suitable material. For example, the first glove box 32A can include a mineral filled polypropylene. As a more specific example, the first glove box 32A can include a talc-filled polypropylene.

The second glove box 32B can be substantially similar to the first glove box 32A. Therefore, the above description of the first glove box 32A can also apply to the second glove box 32B. The only substantial difference between the first glove box 32A and the second glove box 32B is that the second glove box 32B can be a mirror image of the first glove box 32A because it can be positioned at the passenger side of the car 10.

Figure 3:
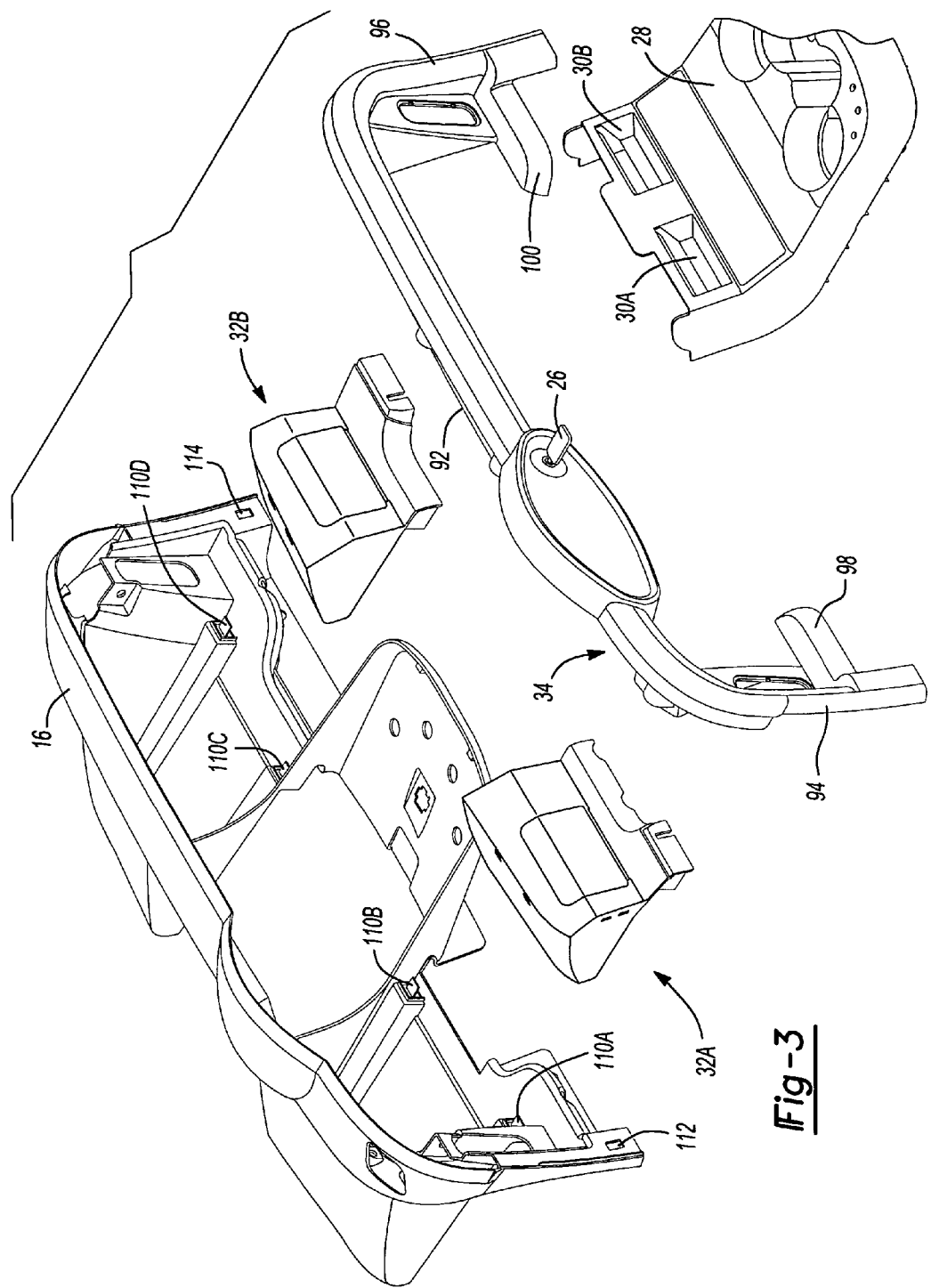
FIG. 3 is an exploded view of the instrument panel of the golf car.
Figure 4:
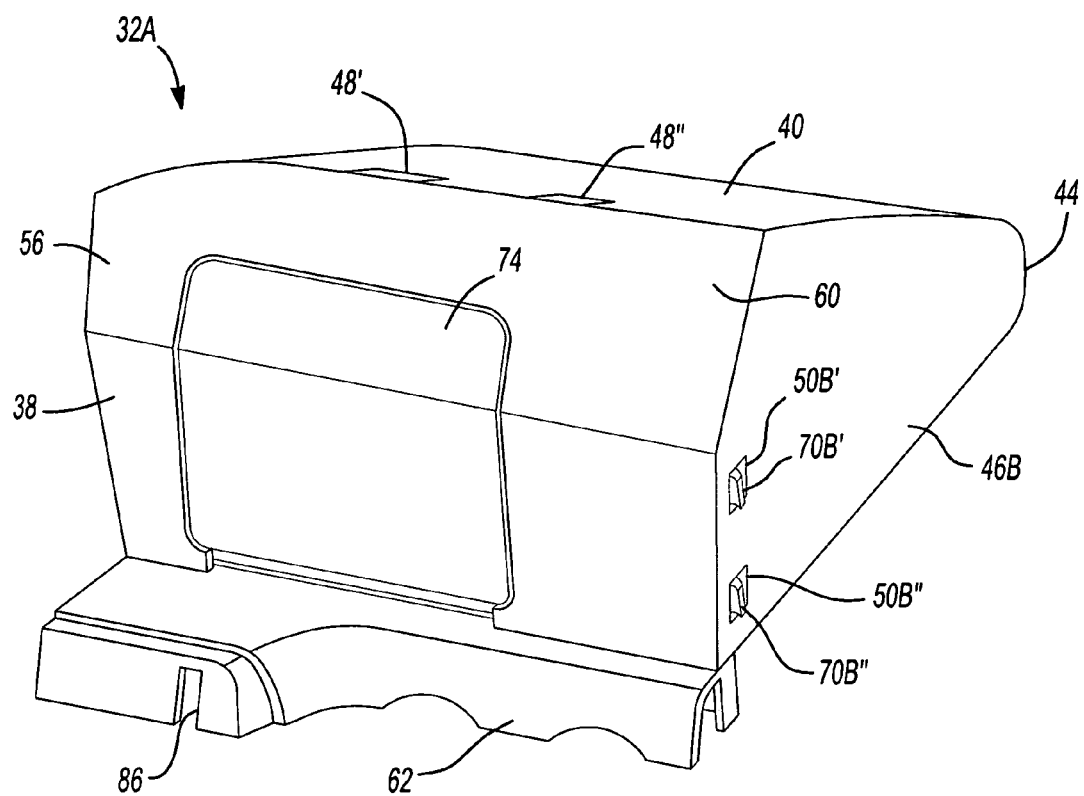
FIG. 4 is a front perspective view of a glove box separated from the instrument panel.
Figure 8:
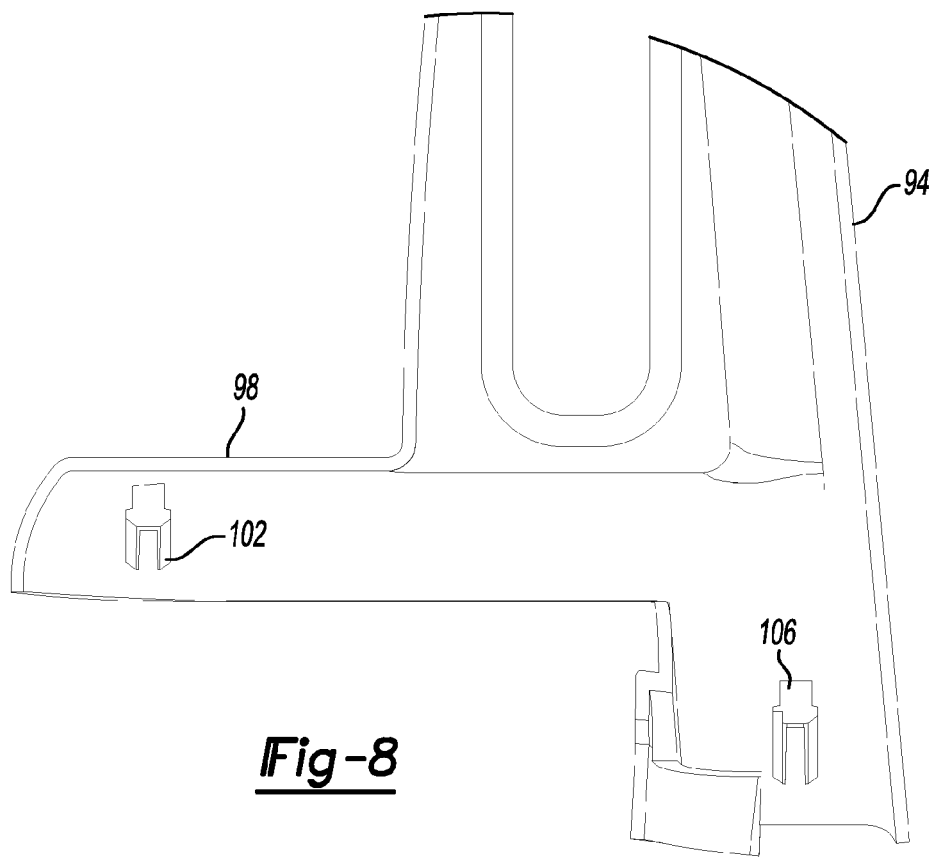
FIG. 8 is a close-up view of area A of FIG. 7.
Figure 7:
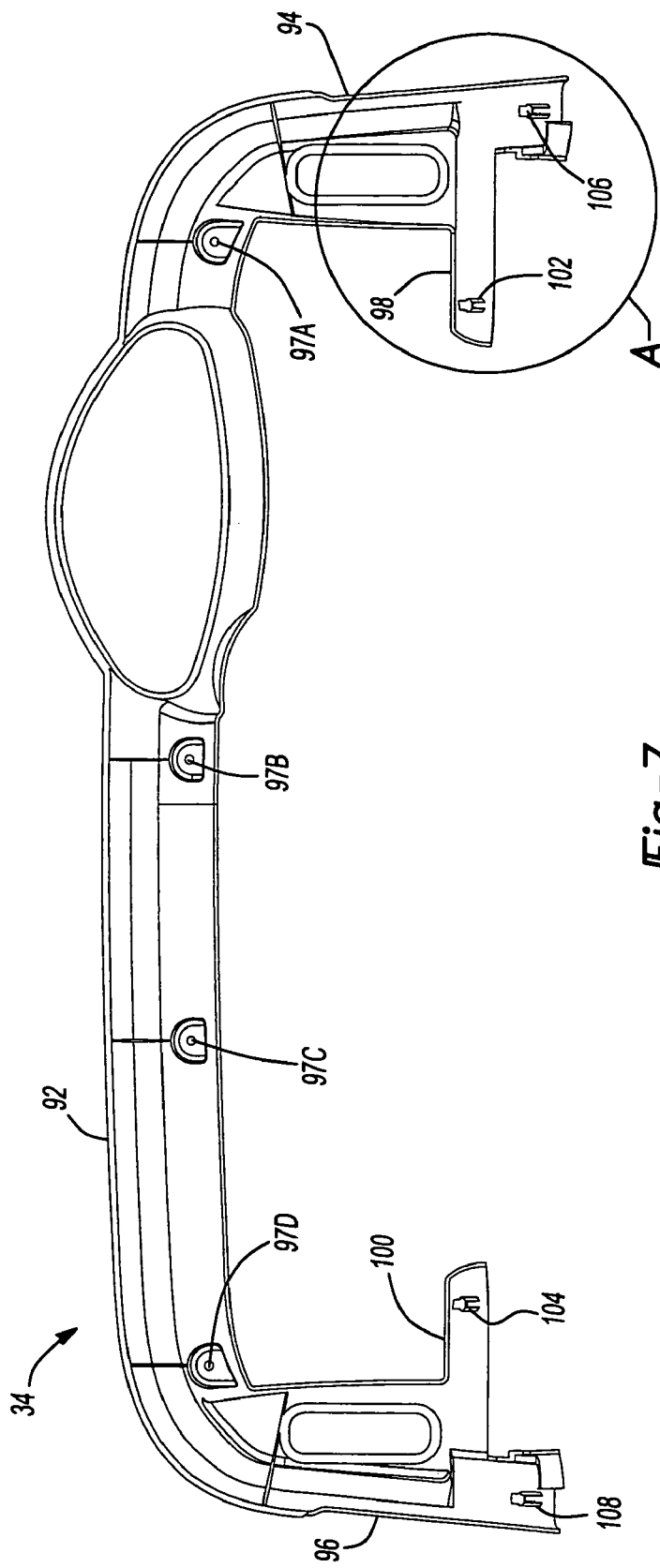
FIG. 7 is a rear view of an instrument panel trim portion.

With additional reference to FIGS. 3 and 7-8, the instrument panel trim portion 34 can include an upper trim portion 92, a first side trim portion 94, and a second side trim portion 96. The upper trim portion 92 can include one or more mounting points, which can take the form of through holes 97A-97D. The through holes 97A-97D can be of any suitable size or configuration for receiving a suitable fastener to secure the instrument panel trim portion 34 to the front body 16.

The first side trim portion 94 can include a first trim flange 98 and the second side trim portion 96 can include a second trim flange 100. The first trim flange 98 can extend from the first side trim portion 94 at about a right angle, or any other suitable angle, relative to the first side trim portion 94. The second trim flange 100 can extend from the second side trim portion 96 at about a right angle, or any other suitable angle, relative to the second side trim portion 96.

As illustrated in FIGS. 7 and 8, the first trim flange 98 can include a first detail 102 and the second trim flange 100 can include a second detail 104. The first detail 102 and the second detail 104 can be similar. The first and the second details 102 and 104 can extend from a rear portion of the first and the second trim flanges 98 and 100 respectively toward the front end 12 of the golf car 10 when the IP trim portion 34 is mounted to the car 10.

The first side trim portion 94 can further include a first trim locking stud 106. The first trim locking stud 106 can be at a bottom end of the first side trim portion 94 and can be any suitable locking mechanism operable to cooperate with a corresponding locking mechanism of the front body 16, further described below, to secure the first side trim portion 94 to the front body 16. The second side trim portion 96 can further include a second trim locking stud 108. The second trim locking stud 108 can be at a bottom end of the second side trim portion 96 and can be any suitable locking mechanism operable to cooperate with a corresponding locking mechanism of the front body 16, further described below, to secure the second side trim portion 96 to the front body 16.

As illustrated in FIG. 3, the front body 16 can include one or more locking tongues 110 to help secure the first and the second glove boxes 32A and 32B within the front body 16. In particular, the front body 16 can include first and second locking tongues 110A and 110B to help secure the first glove box 32A, as well as third and fourth locking tongues 110C and 110D to help secure the second glove box 32B. The locking tongues 110A-110D can each be similar. The locking tongues 110A-110D can each be tabs or extensions that protrude from an inner surface of the front body 16 toward the rear end 14 of the car 10.

The front body 16 can further include a first locking receptacle 112 and a second locking receptacle 114. The first locking receptacle 112 can be positioned at a driver's side portion of the front body 16 and the second locking receptacle 114 can be positioned at a passenger's side portion of the front body 16. The first and the second locking receptacles 112 and 114 can be any suitable locking features operable to securely receive the first and the second locking studs 106 and 108 respectively of the instrument panel trim portion 34 to secure the instrument panel trim portion 34 to the front body 16. As illustrated, the first and the second locking receptacles 112 and 114 can be openings in the front body 16 near a bottom portion of the front body 16.

Installation of the first glove box 32A within the front body 16 will now be described. With reference to FIG. 3, the first glove box 32A is inserted within the front body 16 so that the first locking tongue 110A engages the first slot 88 of the first glove box 32A and the second locking tongue 110B engages both the aperture 54 and the second slot 90 of the first glove box 32A. The second glove box 32B can be similarly situated to engage the third and fourth locking tongues 110C and 110D.

After the first and the second glove boxes 32A and 32B are seated within the front body 16 the instrument panel trim portion 34 can be mounted to the front body 16. The instrument panel trim portion 34 can be mounted to the front body 16 in any suitable manner. For example, the trim portion 34 can be mounted to the front body 16 using suitable fasteners that can each extend through one of the through holes 97A-D and through cooperation of the first and the second trim locking studs 106 and 108 with the first and the second locking receptacles 112 and 114 respectively.

The trim portion 34 can be positioned such that the first trim flange 98 overlaps at least a portion of the trim base 62 of the first storage bin 32A and the first detail 102 of the first trim flange 98 interlocks with the slit 86. In this manner, the trim portion 34 can help to secure the first storage bin 32A within the front body 16. The trim portion 34 can help to secure the second storage bin 32B within the front body 16 in a similar manner. In particular, the second detail 104 of the second trim flange 100 can engage a slit of the second storage bin 32B to help secure the second storage bin 32B into position.

In applications where the first and the second glove boxes 32A and 32B are not used, a trim piece resembling the trim base 62 of the glove boxes 32A and 32B can be positioned between each of the first and second trim flanges 98 and 100 to take the place of the first and second glove boxes 32A and 32B. Therefore, the present teachings provide for a single instrument panel 22 and instrument panel trim portion 34 that can be used in applications with and without the glove boxes 32A and 32B.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A golf car glove box comprising:
   an upper portion;
   a lower portion opposite to said upper portion;
   a rear portion;
   a face portion opposite to said rear portion having a first locking member extending from a first side and a second locking member extending from a second side;
   a first side portion between said rear portion and said face portion having a first notch opening;
   a second side portion between said rear portion and said face portion having a second notch opening;
   an aperture defined by said face portion;
   a door mounted within said aperture with a hinge; and
   a trim base extending from said face portion;
   wherein said glove box defines an enclosed space when the face portion is fastened to the first and second side portions with the first locking member received in the first notch opening and the second locking member received in the second notch opening.

2. The golf car glove box of claim 1, wherein said upper portion, said lower portion, said first side portion, said second side portion, and said rear portion are all integral to form a main body of said glove box.

3. The golf car glove box of claim 1, wherein said face portion includes a locking mechanism to secure said door in a closed position.

4. The golf car glove box of claim 1, wherein said glove box comprises a mineral filled polypropylene.

5. The golf car glove box of claim 1, wherein said glove box comprises a talc-filled polypropylene.

6. A golf car glove box comprising:
   an upper portion;
   a lower portion opposite to said upper portion;
   a rear portion;
   a face portion opposite to said rear portion;
   a first side portion between said rear portion and said face portion;
   a second side portion between said rear portion and said face portion;
   an aperture defined by said face portion;
   a door mounted within said aperture with a hinge; and
   a trim base extending from said face portion;
   wherein said glove box defines an enclosed space; and
   wherein said trim base comprises at least one locking mechanism for cooperating with a golf car front body.

7. A golf car comprising:
   A front body at a front end of said golf car;
   a glove box mounted to said front body, said glove box comprising:
   an upper portion;
   a lower portion opposite to said upper portion;
   a rear portion;
   a face portion opposite to said rear portion;
   an aperture defined by said face portion;
   a door mounted within said aperture; and
   a trim base extending from said face portion and secured to said front body; and
   an instrument panel trim portion mounted to said front body and said trim base.

8. The golf car of claim 7, wherein said glove box defines an enclosed space independent of said front body.

9. The golf car of claim 7, wherein said door is mounted within said aperture with a hinge.

10. The golf car of claim 7, wherein said glove box comprises a mineral filled polypropylene.

11. The golf car of claim 7, wherein said instrument panel trim portion comprises a trim flange having a locking detail, said locking detail cooperates with a slit of said trim base to secure said glove box to said front body.

12. The golf car of claim 7, wherein said glove box is between said instrument panel trim portion and said front body.

13. The golf car of claim 7, wherein said front body comprises at least one locking tongue and said glove box comprises at least one slot in cooperation with said locking tongue to secure said glove box within said front body.

14. A golf car comprising:
   a front body at a front end of said golf car, said front body comprising a plurality of fastening devices;
   a glove box defining an enclosed space independent of said front body mounted within said front body, said glove box in cooperation with said fastening devices to secure said glove box within said front body; and
   an instrument panel trim portion mounted to said front body and said glove box to secure said glove box within said front body;
   wherein said glove box comprises a door mounted to said glove box with a hinge, said door operable to be moved to an open position to grant access to said enclosed space and to a closed position to deny access to said enclosed space.

15. The golf car of claim 14, wherein said glove box comprises a trim base and said instrument panel trim portion cooperates with said trim base.

16. The golf car of claim 14, wherein said glove box further comprises a locking mechanism to secure said door in said closed position.

17. The golf car of claim 14, wherein said glove box comprises a talc-filled polypropylene.

* * * * *